US009582692B2

United States Patent
Mitchell et al.

(10) Patent No.: US 9,582,692 B2
(45) Date of Patent: Feb. 28, 2017

(54) SYSTEMS AND METHODS FOR RFID INSPECTION

(71) Applicant: The Boeing Company, Seal Beach, CA (US)

(72) Inventors: Timothy M. Mitchell, Seattle, WA (US); Anil Kumar, Sammamish, WA (US); Winfeng Li, Renton, WA (US); Kevin Yong Ung, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 13/756,220

(22) Filed: Jan. 31, 2013

(65) Prior Publication Data

US 2014/0210598 A1 Jul. 31, 2014

(51) Int. Cl.
| G08B 25/00 | (2006.01) |
| H04Q 5/22 | (2006.01) |
| G08B 13/14 | (2006.01) |
| G06K 7/10 | (2006.01) |
| G06K 7/00 | (2006.01) |
| G06K 17/00 | (2006.01) |
| B64D 11/00 | (2006.01) |

(52) U.S. Cl.
CPC ....... *G06K 7/10158* (2013.01); *G06K 7/0008* (2013.01); *G06K 7/10217* (2013.01); *B64D 11/00* (2013.01); *G06K 2017/0051* (2013.01)

(58) Field of Classification Search
CPC .... H04Q 5/22; G06K 19/0701; G06K 7/0008; G06K 19/0723; G07C 9/00111
USPC ....... 340/10.1–10.5, 8.1, 10.41, 10.34, 572.1
See application file for complete search history.

(56) References Cited

U.S. PATENT DOCUMENTS

| 7,589,636 | B2 | 9/2009 | Ayyagari et al. | |
| 7,706,765 | B2* | 4/2010 | Collins | H04L 12/413 340/10.1 |
| 2006/0176152 | A1 | 8/2006 | Wagner et al. | |
| 2006/0197652 | A1* | 9/2006 | Hild | G06K 7/0008 340/10.2 |
| 2006/0214773 | A1* | 9/2006 | Wagner | G06K 7/0008 340/10.2 |
| 2006/0267730 | A1* | 11/2006 | Steinke | G06K 7/0004 340/10.1 |
| 2008/0042803 | A1* | 2/2008 | Posamentier | 340/10.1 |
| 2008/0080197 | A1* | 4/2008 | Heine | B60Q 3/0253 362/471 |
| 2008/0100439 | A1* | 5/2008 | Rinkes | G06K 7/0008 340/572.1 |
| 2008/0100450 | A1* | 5/2008 | Ayyagari | B64D 25/18 340/572.7 |

(Continued)

OTHER PUBLICATIONS

EPO Extended Search Report for related application 14152874.5 dated Dec. 1, 2015; 8 pp.

*Primary Examiner* — George Bugg
*Assistant Examiner* — Munear Akki
(74) *Attorney, Agent, or Firm* — Armstrong Teasdale LLP (57) ABSTRACT

A radio-frequency identification (RFID) reader is provided The RFID reader includes a transmitter/receiver module configured to transmit a radio signal at a plurality of different power levels, and a control module coupled to the transmitter/receiver module and configured to control the power level at which the radio signal is transmitted based on a number of RFID tags detected when transmitting the radio signal at an initial power level.

24 Claims, 7 Drawing Sheets

(56) References Cited

U.S. PATENT DOCUMENTS

| | | | |
|---|---|---|---|
| 2008/0111661 A1* | 5/2008 | Lin | G06K 7/0008 340/10.1 |
| 2008/0231449 A1* | 9/2008 | Moshfeghi | G01D 21/00 340/572.1 |
| 2008/0278292 A1* | 11/2008 | Nierenberg | G08C 21/00 340/10.3 |
| 2009/0231142 A1 | 9/2009 | Nikitin et al. | |
| 2012/0223817 A1* | 9/2012 | Hansen | G07C 1/24 340/10.33 |

* cited by examiner

SYSTEMS AND METHODS FOR RFID INSPECTION

BACKGROUND

The field of the disclosure relates generally to radio-frequency identification (RFID) systems, and more specifically, to an RFID reader for transmitting radio signals at a plurality of power levels.

Known RFID systems utilize RFID readers and RFID tags. The RFID reader interrogates an RFID tag by transmitting a radio signal to the tag and receiving a response radio signal from the tag. The radio response signal may include information about an object to which the RFID tag is attached. Accordingly, by interrogating a plurality of RFID tags, information about a plurality of objects can be retrieved relatively quickly.

However, depending on a location of the RFID tag and/or RFID reader, different power levels may be needed to detect different RFID tags. At least some known RFID readers allow a user to manually change the power level until an RFID tag is detected. However, using such a trial and error process to detect RFID tags may be time-consuming, and may result in missing (i.e., not detecting) one or more RFID tags. Accordingly, in some assemblies, such as vehicles, items are often manually checked rather than using automated RFID systems. However, manually checking items, such as safety equipment and/or maintenance equipment, generally is more time-consuming and/or labor-intensive. Further, manually checking items may result in human error, making manual checks limited in their reliability.

BRIEF DESCRIPTION

In one aspect, a radio-frequency identification (RFID) reader is provided. The RFID reader includes a transmitter/receiver module configured to transmit a radio signal at a plurality of different power levels, and a control module coupled to the transmitter/receiver module and configured to control the power level at which the radio signal is transmitted based on a number of RFID tags detected when transmitting the radio signal at an initial power level.

In another aspect, a method for operating a radio-frequency identification (RFID) reader is provided. The method includes transmitting a radio signal from the RFID reader at an initial power level, determining, using a processing device, a number of RFID tags detected when transmitting the radio signal at the initial power level, and controlling, using the processing device, the power level of the RFID reader based on the number of RFID tags detected.

In yet another aspect, a method for confirming a location of at least one object, is provided. The method includes receiving, at a processing device, configuration information, determining location information, scanning, using an radio-frequency identification (RFID) reader, at least one RFID tag associated with the at least one object, and integrating, using the processing device, the configuration and location information to confirm the location of the at least one object.

The features, functions, and advantages that have been discussed can be achieved independently in various implementations or may be combined in yet other implementations, further details of which can be seen with reference to the following description and drawings.

DETAILED DESCRIPTION

The systems and methods described herein facilitate operation of an RFID reader. A power level of an interrogation signal transmitted from the RFID reader is controlled based on the number of RFID tags detected. The RFID reader also integrates configuration information and location information to confirm a location of one or more objects that include an RFID tag.

Technical effects of the methods and systems described herein include at least one of: (a) transmitting a radio signal from an RFID reader at an initial power level; (b) determining, using a processing device, a number of RFID tags detected when transmitting the radio signal at the initial power level; and (c) controlling the power level of the RFID reader based on the number of RFID tags detected. Technical effects of the methods and systems described herein further include at least one of (a) receiving configuration information; (b) determining location information; (c) scanning at least one RFID tag associated with the at least one object; and (d) integrating the configuration and location information to confirm the location of the at least one object.

Figure 1:
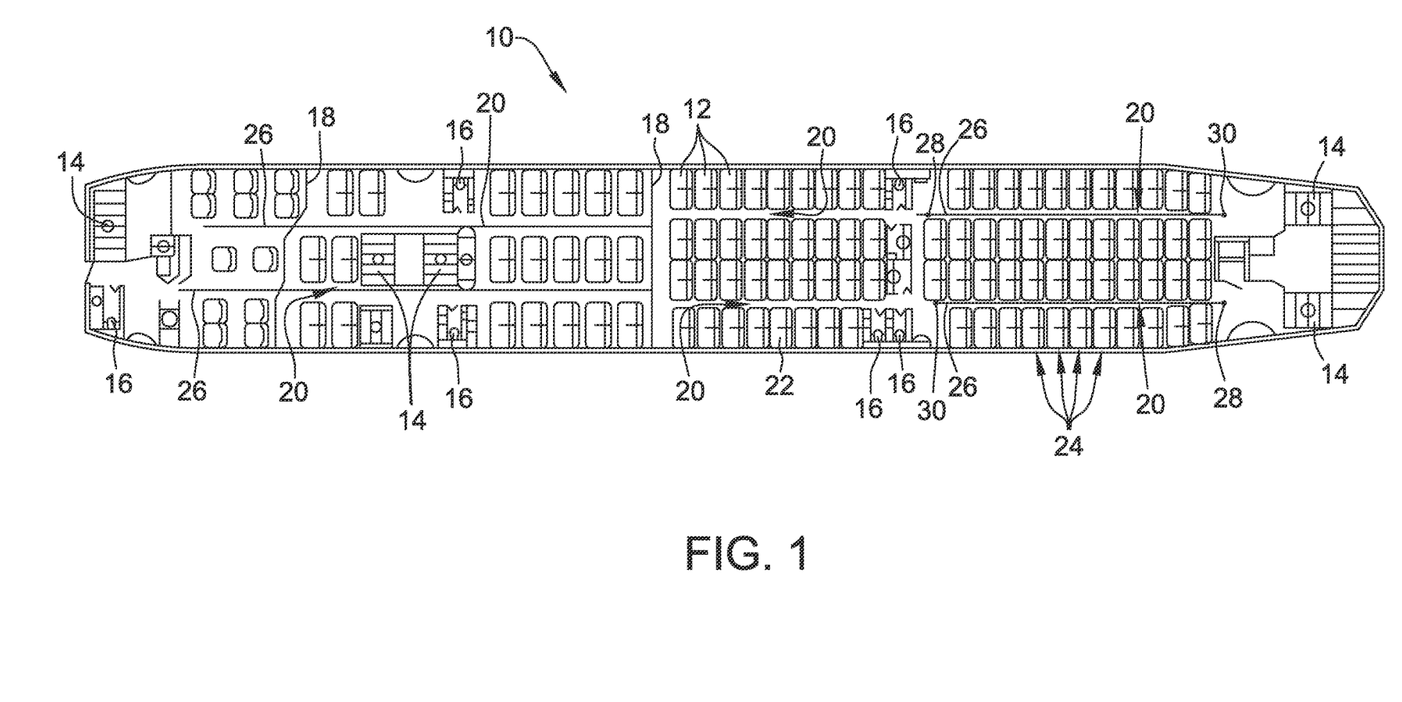
FIG. 1 is a schematic plan view of an exemplary aircraft fuselage.

FIG. 1 is a schematic plan view of an exemplary fuselage of an aircraft 10. Aircraft 10 includes a plurality of internal equipment arranged in one of a plurality of configurations. For example, passenger seats 12, galleys 14, lavatories 16, and bulkheads 18 may be arranged in configurations designed to accommodate different passenger class areas and service requirements. Passenger seats 12 are generally arranged in a configuration that permits access to an aisle 20 from no more than two or three seats away. In the exemplary implementation, passenger seats 12 include a pair of seats fabricated together to form a seat assembly 22. Seat assemblies 22 are grouped together in such a manner that aisles 20 and a space accommodating passengers' legs are formed. A pitch of seat assemblies 22 between each row 24 of seat assemblies is dependent on the space selected for accommodating passengers' legs. In various passenger class areas, seats 12 and spacing between seat assemblies 22 may be different.

An aircraft configuration, such as a layout of passenger accommodations (LOPA), details the placement of the interior equipment and in particular the location of seat assemblies 22. The configuration of the aircraft internal equipment may be changed to accommodate a change in service for the aircraft. Aisles 20 define a path 26 that include a starting point 28 and an ending point 30.

In the exemplary implementation, each seat 12 includes a flotation device or life vest (not shown) for use by the passenger seated in seat 12 in a case of an emergency landing in water. Safety and government regulations generally require a check of the presence of a life vest for each seat and an efficiency of each life vest as demonstrated typically by an expiration date associated with each life vest.

The life vest may be stowed under seat 12 or in an armrest associated with seat 12. Manual checks of each life vest are labor intensive and time consuming. Applying a sensor mote such as an RFID-enabled tag to each life vest can facilitate identifying and locating the one or more life vests. While the exemplary implementations described herein are implemented in the context of an aircraft, the systems and methods disclosed are not limited thereto.

Figure 2:
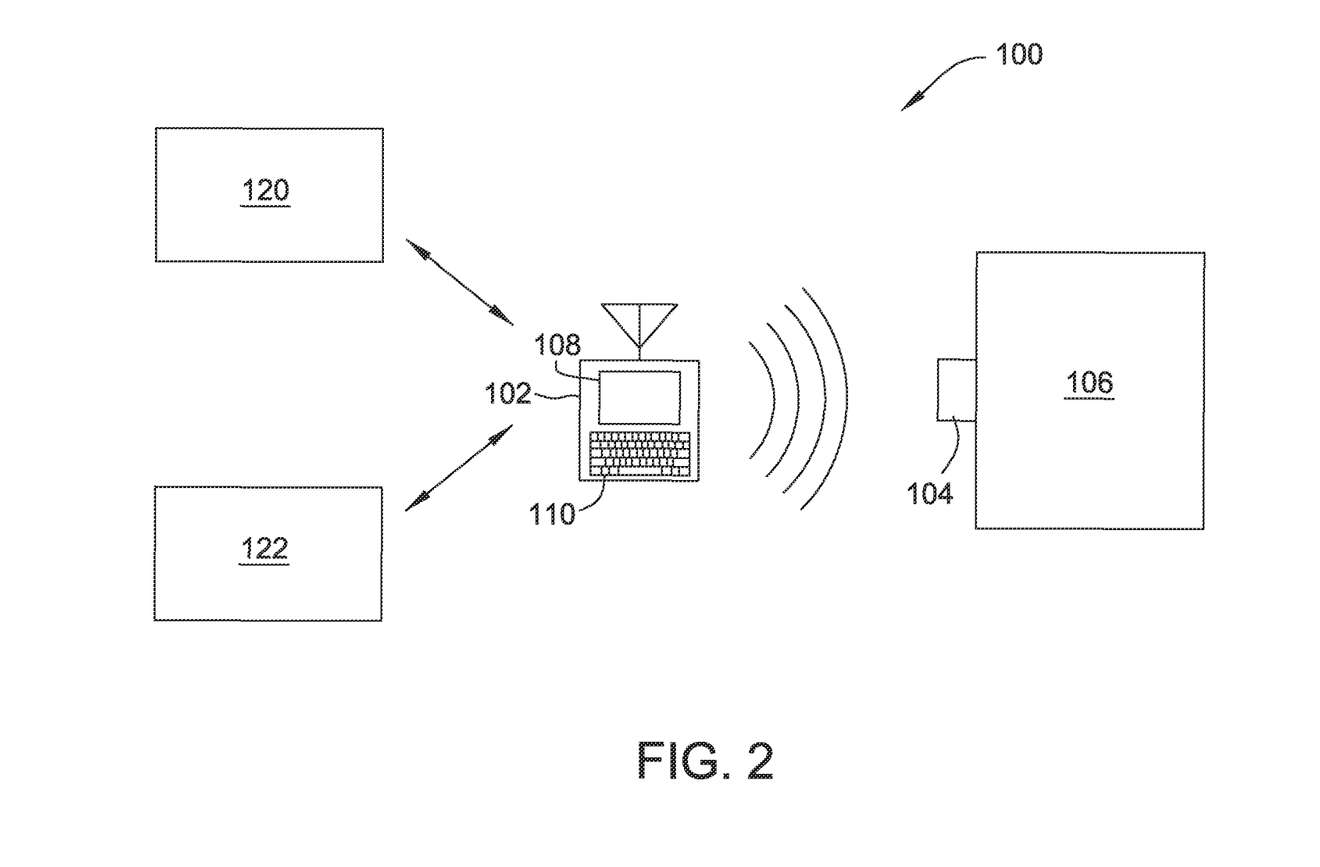
FIG. 2 is a schematic diagram of an exemplary RFID system.

FIG. 2 is a schematic diagram of an exemplary radio-frequency identification (RFID) system 100 that includes an RFID reader 102 and at least one RFID tag 104 attached to and/or included as part of an object 106. In the exemplary implementation, RFID reader 102 is a portable, handheld reader. Alternatively, RFID reader 102 is a fixed reader that is mounted and/or installed in an operating environment, such as a vehicle. RFID reader 102 includes a display 108 for displaying information and a user input device 110, such as a keyboard, for receiving input from a user.

RFID reader 102 is configured to transmit an interrogation radio signal at a plurality of power levels, as described in detail herein. Further, RFID reader 102 is configured to integrate location data and configuration data to determine and/or confirm the location of one or more objects 106 including RFID tags 104, as described in detail herein.

Interrogating RFID tag 104 using RFID reader 102 enables identification of object 106. To interrogate RFID tag 104, RFID reader 102 transmits an interrogation radio signal. The interrogation radio signal is transmitted at a plurality of power levels, as described in detail herein. Further, RFID reader 102 is configured to integrate location data and configuration data to confirm the location of an RFID tag 104, and accordingly the corresponding object 106, as described in detail herein.

When RFID tag 104 receives the transmitted radio signal from RFID reader 102, RFID tag 104 emits a response radio signal. Specifically, the RFID tag 104 includes a receiver (not shown) for receiving the interrogation radio signal, and a transmitter (not shown) for transmitting the response radio signal. The response radio signal includes identification information related to object 106. For example, the response radio signal may include a unique tag serial number, an expiration date of object 106, a stock number of object 106, a lot or batch number of object 106, a location of object 106, and/or other information pertinent to object 106.

Object 106 may be any article for which it is desirable to obtain information about the article. For example, in some implementations, system 100 is implemented onboard a moving vehicle, such as aircraft 10 (shown in FIG. 1). In an aircraft operating environment, object 106 may be aircraft maintenance equipment, aircraft safety equipment, and/or other aircraft articles. For example, object 106 could be a seat, seatbelt, a flotation device, an oxygen mask, a fire extinguisher, and/or any other suitable article.

The response radio signal transmitted from RFID tag 104 is received by RFID reader 102. In the exemplary implementation, RFID reader 102 transmits the received radio response signal to a computer system (not shown) running software for extracting the identification information from the response radio signal. Alternatively, RFID reader 102 may include suitable software extracting the identification information from the radio response signal.

In the exemplary implementation, RFID tag 104 is a passive RFID tag that uses radio energy in the interrogation radio signal to generate and emit the response radio signal. Alternatively, RFID tag 104 may be an active RFID tag that includes a battery that periodically transmits the response radio signal. Further, RFID tag 104 may be read-only or read/write, in which data can be written into RFID tag 104.

Although FIG. 2 shows only one RFID tag 104 attached to one object 106, it will be appreciated that system 100 may include a plurality of RFID tags 104 each attached to a respective object. Accordingly, RFID reader 102 is capable of reading a plurality of RFID tags 104 to acquire identification information for a plurality of objects 106.

The detection range of RFID reader 102 depends on a power level of the transmitted interrogation signal. That is, the higher the power level, the further away RFID reader 102 can detect RFID tags 104. Accordingly, in the exemplary implementation, the power level is controlled to facilitate efficient and accurate detection of RFID tags 104, as described in detail herein.

In the exemplary implementation, RFID reader 102 is in communication with a configuration database 120 and a location system 122. By integrating data received from configuration database 120 and location system 122, when RFID reader 102 detects an RFID tag 104, RFID reader 102 can confirm the location of RFID tag 104, as described in detail herein.

Figure 3:
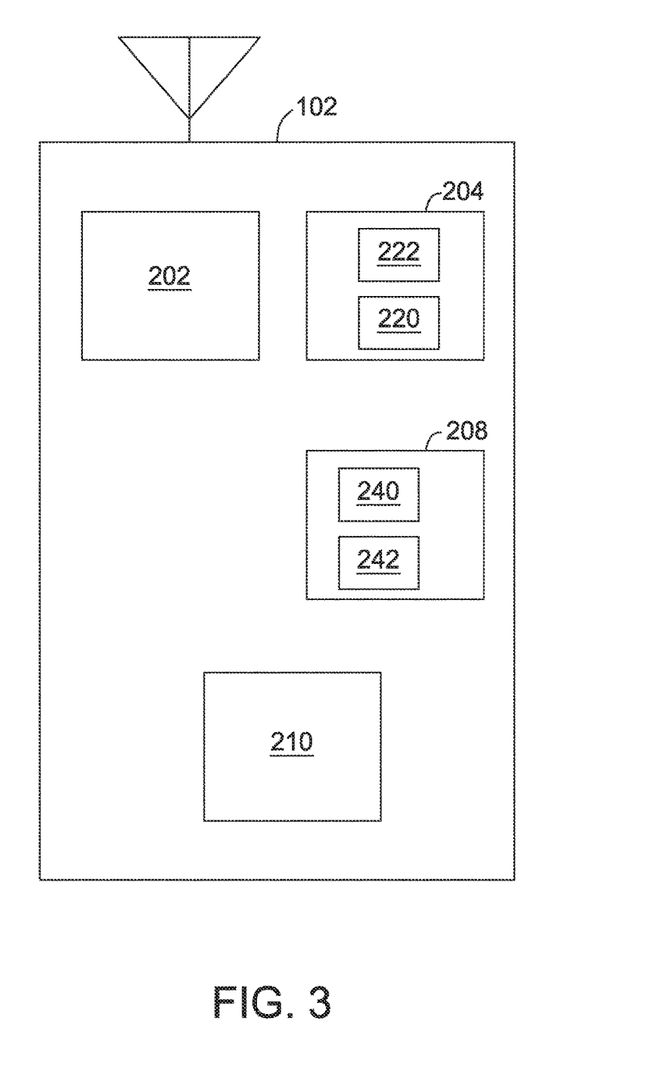
FIG. 3 is a block diagram of an exemplary RFID reader that may be used with the system shown in FIG. 2.

FIG. 3 is a block diagram of RFID reader 102 that may be used with RFID system 100 (shown in FIG. 2). In the exemplary implementation, RFID reader 102 includes a transmitter/receiver module 202, a control module 204, a user interface module 208, and a communications module 210.

Transmitter/receiver module 202 transmits interrogation radio signal and receives response radio signal from RFID tag 104 (shown in FIG. 1). In the exemplary implementation, transmitter/receiver module 202 is capable of transmitting and interrogation radio signals at a plurality of power levels.

Control module 204 instructs transmitter/receiver module 202 to transmit the interrogation radio signal at a specified power level. In the exemplary implementation, control module 204 includes at least one memory device 220 and a processing device 222 that is coupled to memory device 220 for executing instructions. In some implementations, executable instructions are stored in memory device 220. Control module 204 performs one or more operations described herein by programming processing device 222. For example, processing device 222 may be programmed by encoding an operation as one or more executable instructions and by providing the executable instructions in memory device 220.

Processing device 222 determines what power level control module 204 should instruct transmitter/receiver module 202 to transmit interrogation radio signals at. Processing device 222 may include one or more processing units (e.g., in a multi-core configuration). Further, processing device 222 may be implemented using one or more heterogeneous processor systems in which a main processor is present with secondary processors on a single chip. As another illustrative example, processing device 222 may be a symmetric multi-processor system containing multiple processors of the same type. Further, processing device 222 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory device 220 is one or more devices that enable information such as executable instructions and/or other data to be stored and retrieved. Memory device 220 may include one or more computer readable media, such as, without limitation, dynamic random access memory (DRAM), static random access memory (SRAM), a solid state disk, and/or a hard disk. Memory device 220 may be configured to store, without limitation, application source code, application object code, source code portions of interest, object code portions of interest, configuration data, execution events and/or any other type of data.

User interface module 208 includes an input device 240, such as user input device 110 (shown in FIG. 2). Input device 240 may include a toggle switch, a touchscreen, keypad and/or keyboard, and/or mouse that enables a user to enter information and interact with RFID reader 102. A user can use input device 240 to select which object 106 or plurality of objects 106 (and corresponding RFID tags 104) RFID reader 102 should attempt to detect. Further, using input device 240, a user can manually input a location of RFID reader 102. In some embodiments, the user manually inputs the location of RFID reader 102 by specifying a location and the direction the reader is currently facing. Further, in some embodiments, RFID reader 102 may generate a request for the user to manually input the location of RFID reader 102. For example, RFID reader 102 may request the user provide the location of RFID reader 102 after a predetermined number of RFID tags 104 are scanned or after a predetermined area (e.g., a predetermined number of rows) of a vehicle is scanned.

In the exemplary implementation, user interface module 208 also includes a display device 242, such as display 108 (shown in FIG. 1) that enables a user to view information pertinent to the operation of RFID reader 102. For example, display device 242 may display the current location of RFID reader 102, the current interrogation radio signal power level, and/or the currently detected RFID tag 104/object 106. Display device 242 may include, for example, a cathode ray tube (CRT), a liquid crystal display (LCD), an organic LED (OLED) display, and/or an "electronic ink" display. In some implementations, a touch screen functions as both display device 242 and input device 240.

Communications module 210 transmits and receives data for RFID reader 102. Communications module 210 transmits and receives data using any suitable communications medium, including, but not limited to, a wired and/or wireless network, an Iridium satellite network, radio, 3G, Controller Pilot Data Link (CPDL), and Tactical Digital Information Links (TADIL). In the exemplary implementation, communications module 210 transmits and receives data to and from configuration database 120 and location system 122 (both shown in FIG. 2). For example, communications module 210 may communicate with location system 122 to determine a location of RFID reader 102. Further, communications module 210 may receive configuration data, such as a configuration of aircraft 10, from configuration database 120.

Data transmitted and/or received by communications module 210 may also include identification information received from RFID tag 104 (shown in FIG. 1). In implementations where RFID reader 102 is located onboard a vehicle, communications module 210 may facilitate communications and integration between RFID reader 102 and one or more vehicle systems. For example, in at least some implementations, communications module 210 communicates with one or more aircraft flight and/or navigation systems.

Figure 4:
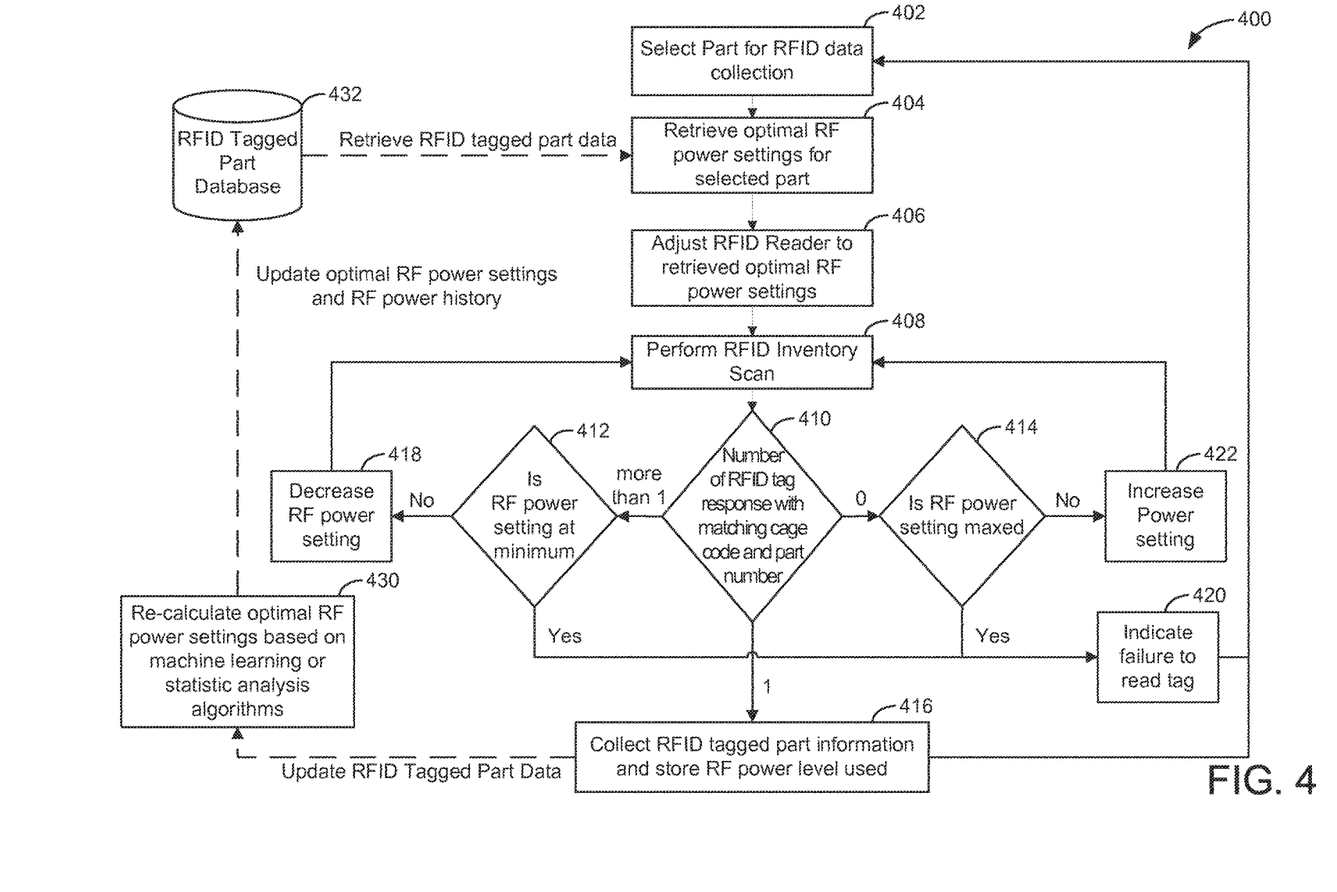
FIG. 4 is a flow diagram that may be used with the RFID reader shown in FIG. 2.

FIG. 4 is a flow diagram of a method 400 for controlling a power level of a transmitted interrogation radio signal that may be used with RFID reader 102 (shown in FIGS. 2 and 3). In the exemplary implementation, the power level is controlled such that one RFID tag 104 (shown in FIG. 2) is detected at a time. Alternatively, the power level may be controlled such that multiple RFID tags 104 are detected at one time. Unless otherwise specified, a processing device, such as processing device 222 (shown in FIG. 3) performs the steps of method 400.

At block 402, a part (e.g., object 106) for data collection is selected. In the exemplary implementation, the part is selected based on a user input received at input device 240. Alternatively, the part may be selected using any method that enables RFID reader 102 to function as described herein. For example, a part for data collection may automatically be selected based on a determined location of RFID reader 102. Further, in the exemplary method 400, one object 106 is selected. Alternatively, in embodiments where the power level is controlled to identify a plurality of objects 102, the plurality of objects 106 may be identified initially, and block 402 is skipped in subsequent iterations of method 400.

At block 404, optimal RF power settings (i.e., the optimal power level) are retrieved for the selected part. In the exemplary implementation, if no optimal RF power settings were previously stored for the selected part, the optimal power setting is a minimum power level. The minimum power level may be, for example, 1, 5 or 10 milliwatts, or between 0-50 milliwatts, or more particularly between 1-20 milliwatts. Generally, the further RFID tag 102 is from RFID reader 102, the higher the power level required to scan RFID tag 102.

At block 406, the current power level of the RFID reader 102 is adjusted to match the optimal RF power setting from block 404. At block 408, RFID reader 102 performs a scan using the optimal RF power setting. More specifically, RFID reader 102 transmits a radio interrogation signal at the optimal power level.

At block 410, the number of RFID tag responses is determined. That is, processing device 222 determines how many RFID tags 104 transmitted a radio response signal in response to the radio interrogation signal. If more than one RFID tag 104 responds, flow proceeds to block 412. If no RFID tags 104 respond, flow proceeds to block 414. If exactly one RFID tag 104 responds, flow proceeds to block 416.

At block 412, it is determined whether the current power level of RFID reader 102 is the minimum power level. If the current RF power level is not the minimum power level, flow proceeds to block 418 and the power level is decreased. In the exemplary implementation, the power level is decreased by 10 milliwatts. Alternatively, the power level may be decreased by any amount that enables RFID reader 102 to function as described herein. After the power level is decreased at block 418, flow returns to block 408, where RFID reader 102 performs another scan.

If the current power level is the minimum power level, flow proceeds to block 420, where RFID reader 102 indicates a failure to read an RFID tag 104. The indication may be, for example, an icon and/or text displayed on display 108 (shown in FIG. 1) of RFID reader 102. From block 420, flow returns to block 402 for selection of another part for RFID data collection.

At block 414, it is determined whether the current power level of RFID reader 102 is a maximum power level. If the current RF power level is not the maximum power level, flow proceeds to block 422 and the power level is increased. The maximum power level may be, for example, 4000 milliwatts. In the exemplary implementation, the power level is increased by 5 milliwatts. Alternatively, the power level may be increased by any amount that enables RFID reader 102 to function as described herein. After the power level is increased at block 422, flow returns to block 408, where RFID reader 102 performs another scan. If the current power level is the maximum power level, flow proceeds to block 420, where RFID reader 102 indicates a failure to read an RFID tag 104.

At block 416, as exactly one RFID tag 104 has been detected, information from the detected RFID tag 104 is collected, and the flow returns to block 402. The collected information may include a unique tag serial number, an expiration date of object 106, a stock number of object 106, a lot or batch number of object 106, a location of object 106, and/or other information pertinent to object 106. The power level used to scan RFID tag 104 is also collected, and RFID tagged part data is updated using the collected power level.

More specifically, in the exemplary implementation, at block 430, an optimal power level for the selected part is calculated (or re-calculated, if the optimal power level was previously calculated) from the collected power level. The optimal power level may be calculated based on a machine learning algorithm, a statistical analysis algorithm, and/or any algorithm that enables RFID reader 102 to function as described herein.

The RFID tagged part data is updated to include the calculated optimal power level. In the exemplary implementation, the RFID tagged part data is stored on an RFID tagged part database 432, which forms part of memory device 220. In future scans of the specified part, at block 404, the optimal power level is retrieved from RFID tagged part database 432. In addition to the most recently calculated optimal power level for the part, the RFID tagged part data may also include a date of the last detection, a time of the last detection, a part number, a part location, and/or a part description. Accordingly, using method 400, RFID reader 102 controls the power level to facilitate detecting RFID tags 104 on selected parts accurately and efficiently.

Alternatively, power control methods other than method 400 may be utilized. For example, in one implementation, the power level of RFID reader 102 changes based on a location of RFID reader 102. That is, RFID reader 102 may use a first power level in a business class section of the aircraft, and a second, different power level in an economy class section of the aircraft.

Figure 5:
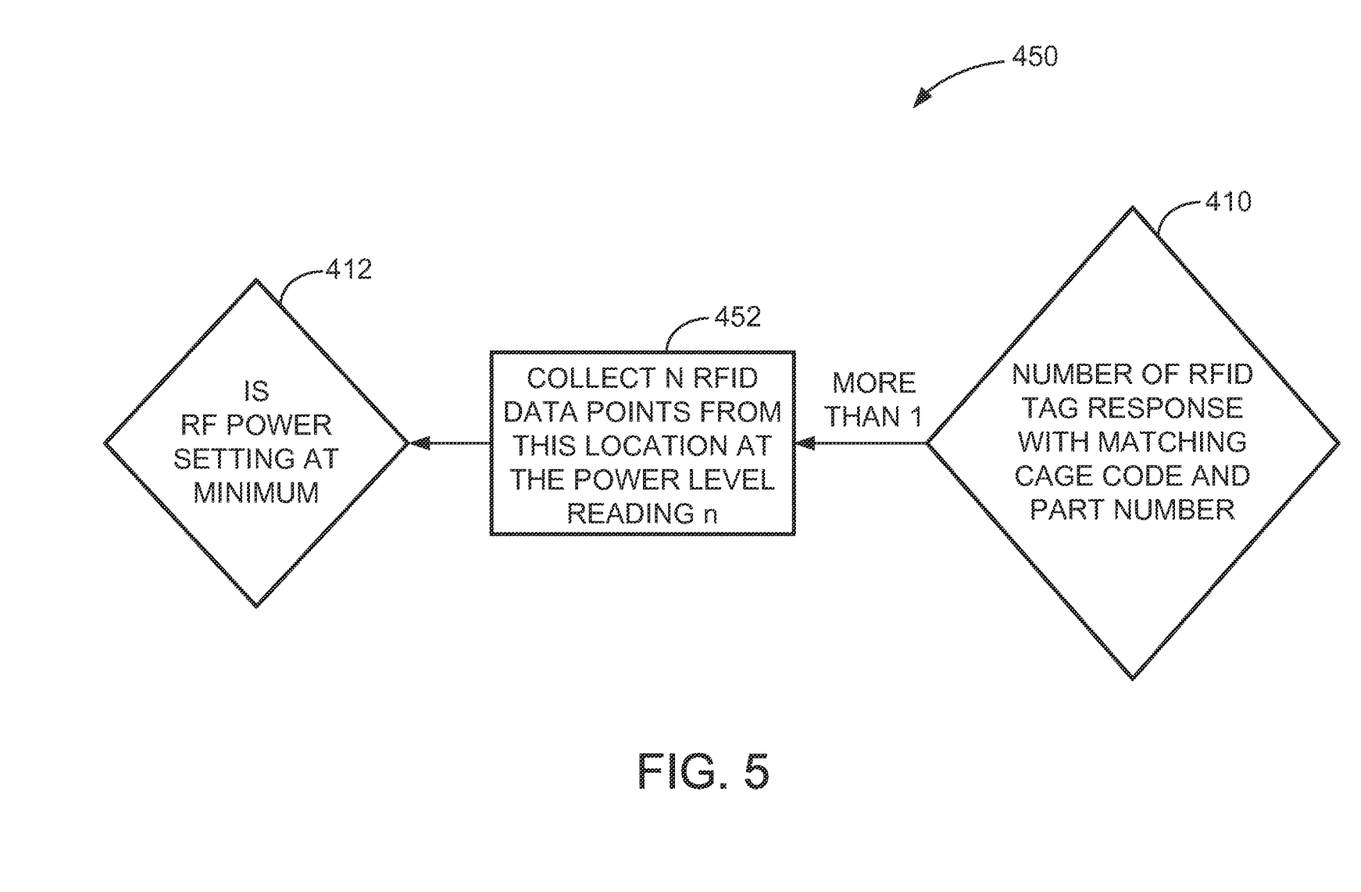
FIG. 5 is an alternative flow that may be implemented in the flow diagram shown in FIG. 4.

FIG. 5 is a flow diagram of an alternative flow 450 that may be implemented in method 400 (shown in FIG. 4). Specifically, relative to method 400, flow 450 adds an additional block 452 between block 410 and block 412.

At block 452, the number of RFID tags 104 detected in the scan at block 408 is collected and stored as a data set, for example, in memory device 220. In the exemplary embodiment, the stored data set also includes the power level currently being utilized and the location of RFID reader 102. For example, for a particular scan, it may be logged that at row four of a vehicle, using a power level of 30 milliwatts, five RFID tags 104 were detected.

For multiple iterations of decremented power, multiple data sets are stored at block 152. For example, for three iterations all taken at the same location, suppose a first data set includes five RFID tags 104 (identified as tags A, B, C, D, and E) detected at 30 milliwatts, a second data set includes four RFID tags 104 (A, B, D, and E) detected at 25 milliwatts, and a third data set includes three RFID tags 104 (A, B, and D) detected at 20 milliwatts. From the multiple data sets, processing device 222 may generate additional information related to the detected RFID tags 104. For instance, in the given example, as tag A was detected during all three scans, but tag C was only detected during the highest power level scan, tag A is very likely closer to RFID reader 102 than tag C.

Notably, block 452 may be used in other embodiments independent from method 400. In some embodiments, RFID reader 102 may perform scans at a plurality of preset power levels, independent of how many RFID tags 104 are detected at each power level. For example, in one embodiment, RFID reader 102 may always perform a high level power scan at a first power level followed by a low level power scan at a second power level lower than the first power level. The location, number of RFID tags 104 detected, and current power level for both of the high and low power level scans can be stored in memory device 220 and analyzed and/or processed using processing device 222.

Figure 6:
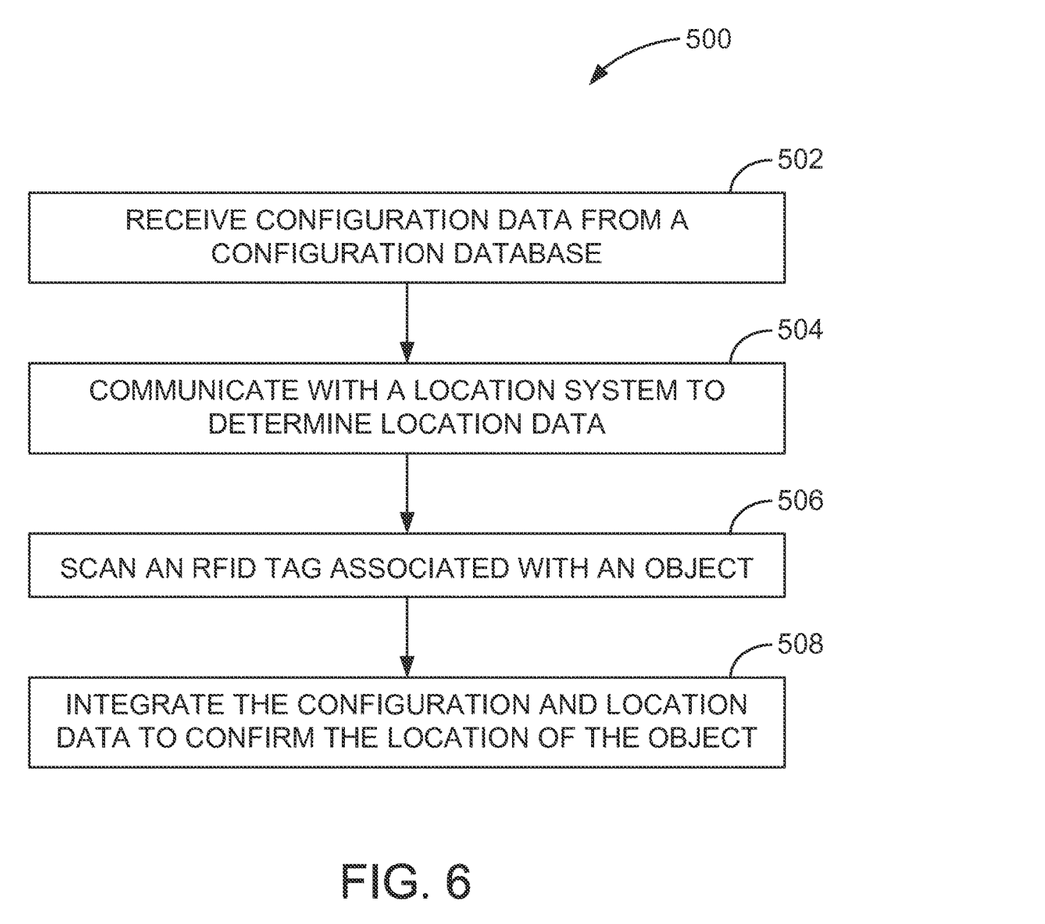
FIG. 6 is flow chart of an exemplary method that may be used with the RFID reader shown in FIG. 2.

FIG. 6 is a flow diagram of a method 500 for verifying a location of an object, such as object 106 (shown in FIG. 2), that may be used with RFID reader 102 (shown in FIGS. 2 and 3). In the exemplary embodiment RFID reader 102 performs the steps of method 500. Alternatively, receiving and processing configuration and location data, as described herein, may be performed by a separate device communicatively coupled to RFID reader 102.

In method 500, RFID reader 102 receives 502 configuration data from configuration database 120 (shown in FIG. 2). In the exemplary implementation, configuration data is a layout of passenger accommodations (LOPA) that includes information on the number and location of passenger equipment, such as seats. The configuration database 120, in the exemplary configuration, is located at a ground station. The RFID reader 102 may communicate with the configuration database using communications module 210 (shown in FIG. 3) and/or vehicle (e.g., aircraft) communications equipment (not shown).

RFID reader 102 communicates 504 with location system 122 (shown in FIG. 2) to determine location data. In the exemplary implementation, location data is determined using a location of RFID reader 102. Location system 122 may include, for example, a global positioning system (GPS) sensor, a sensor located within RFID reader 102 (e.g., an active RFID tag), a multilateration navigation system, and/or an inertial reference unit (IRU). To determine the location of RFID reader 102, RFID reader 102 may communicate 504 with the location system 122 continuously, periodically, and/or upon a user request input using user interface module 208.

From the location of RFID reader 102, the location data, indicating the location of RFID tags 104 scanned using RFID reader 102, can be determined. In the exemplary embodiment, RFID reader 102 has a directionalized antennae having a field of view. Accordingly, the location of RFID tags 104 scanned using RFID reader 102 lies within the field of view. Further, using methods understood by those of ordinary skill in the art, to further pinpoint the location of scanned RFID tags 104, the distance of a given RFID tag 104 from RFID reader 102 can be determined based on the power level used to detect the given RFID tag 104, the response time of the RFID tag 104, and/or the type/response characteristics of RFID tag 104. For example, if different RFID tags 104 have different manufacturers, a transfer function of a given RFID tag 104 may be useful in calculating the location of the RFID tag 104.

RFID reader 102 scans 506 an RFID tag 104 associated with an object 106. The configuration data and location data are integrated 508 to confirm the location of object 106 associated with the scanned RFID tag 104 is in the correct location. More specifically, by integrating 508 the location of the RFID reader 102 (i.e., location data) with a LOPA (i.e., configuration data), the RFID reader 102 can determine where RFID reader 102 (and accordingly RFID tag 104) is currently located relative to vehicle equipment (e.g., seats). In the exemplary implementation, RFID reader integrates 508 the configuration and location data to determine which seat 12 on an aircraft 10 RFID tag 104 is located proximate. Accordingly, if object 106 is a life vest, RFID reader integrates 508 the configuration and location data to determine the scanned life vest is located at a particular seat 12.

In the exemplary embodiment, integrating 508 location and configuration data includes tying the location data to the configuration data (e.g., the LOPA). Specifically, each measured location of an RFID tag 102 is adjusted so that it is consistent with the most proximate expected location on the LOPA. For example, if the LOPA indicates an RFID tag 102 should be present at coordinates (1, 1, 1), and a measured location of a detected RFID tag 102 is (0.9, 1.1, 1), the measured location is matched to (1, 1, 1) to match the LOPA.

By scanning and integrating multiple RFID tags 104, RFID reader 102 (or alternatively, a separate device) is able to more accurately determine the location of RFID reader 102 and RFID tags 104. For example, when three RFID tags 104 are scanned simultaneously by RFID reader 102, a three dimensional relative reference grid can be established. By integrating those three scanned RFID tags 104 with the LOPA, an absolute reference grid tied to the LOPA is established. Further, by cross-checking between multiple techniques (e.g., GPS, multilateration, LOPA, manual location entry by a user, etc.), location data can be further improved.

By integrating 508 location data and configuration data for a plurality of RFID tags 104 a variety of useful information may be collected. For example, in one implementation, using RFID reader 102 it can be determined whether each seat 12 onboard aircraft 10 includes a corresponding life vest (i.e., whether seats and life vests are in a 1:1 ratio) without an operator manually (i.e., visually) checking for a life vest at each seat 12. While the example of seats 12 and life vests onboard aircraft 10 is discussed herein, those of ordinary skill in the art will appreciate that many other implementations involving integrating 508 location data and configuration data to confirm the location of one or more objects 106 are contemplated.

Figure 7:
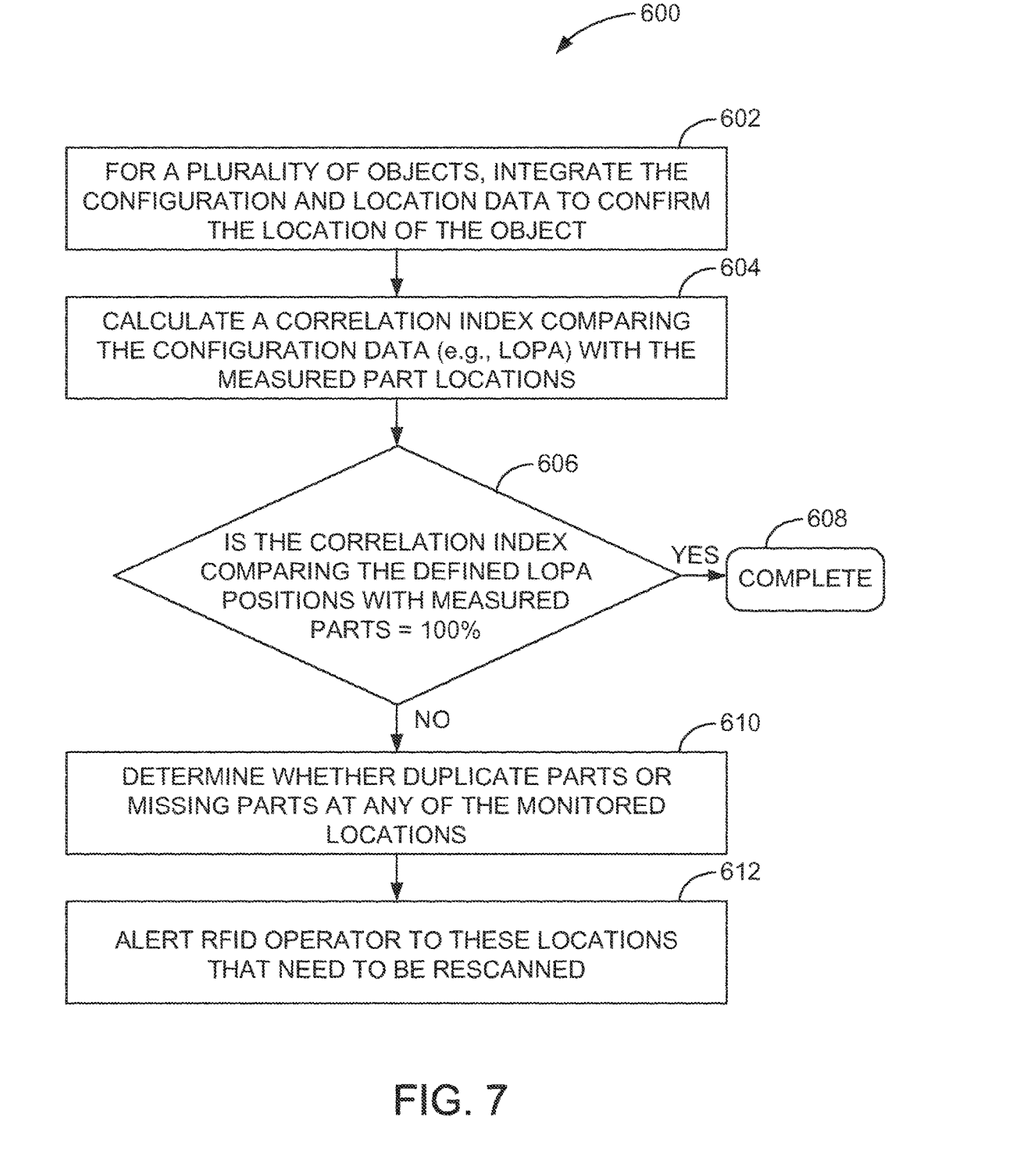
FIG. 7 is a flow chart of an exemplary method that may be used with the RFID reader shown in FIG. 2.

FIG. 7 is a flow diagram of a method 600 for processing integrated configuration and location data for a plurality of objects. In the exemplary embodiment, method 600 is performed by a processing device, such as processing device 222 (shown in FIG. 3). At block 602, configuration and location data for a plurality of objects is integrated, using, for example, the systems and methods described herein. At block 604, a correlation index is calculated. The correlation index compares the configuration data (e.g., a LOPA) with the measured part locations. In the exemplary embodiment, the correlation index represents the number and location of parts measured versus the number and location of parts expected from the configuration data. For example, if a LOPA indicates five parts should be located at five respective locations, and after integrating configuration and location data, five parts are detected at the five respective locations, the correlation index would be 100%. However, if only four total parts were detected at four of the expected locations (i.e., missing parts), five total parts were detected at only four of the expected locations (i.e., duplicate parts), or five parts were detected but one was detected at an unexpected location (i.e., misplaced parts), the correlation index would be 80%. In some embodiments, a correlation index is calculated for each of a plurality of different data pattern overlays (e.g., different sets of configuration data), and the correlation index with the highest percentage is utilized.

At block 606 it is determined whether the calculated correlation index is 100%. If the correlation index is 100%, the method ends at block 608. If the correlation index is less than 100%, at block 610 it is determined which of the monitored locations have duplicate/missing/misplaced parts. At block 612, the user operating RFID reader 102 is alerted to the monitored locations having duplicate or missing parts, such that the user can rescan those locations using RFID reader 102. The user may be alerted, for example, by displaying a message on display device 242 (shown in FIG. 3).

The implementations described herein facilitate operation of an RFID reader. A power level of an interrogation signal transmitted from the RFID reader is controlled based on the number of RFID tags detected. The RFID reader also integrates configuration information and location information to confirm a location of one or more objects that include an RFID tag.

Using the systems and methods described herein, using an RFID reader, an interior of a vehicle can be scanned to accumulate data on the quantity and location of RFID tags associated with required objects (e.g., life vests) located on the vehicle. From this data, it may be determined whether a given object is missing, damaged, improperly installed, and/or expired, saving considerable time and costs (as compared to manual visual inspection) in verifying required parts are installed and/or properly functioning. The methods and systems described herein may be implemented during initial fabrication of the vehicle and/or during operational maintenance, or at any time during the life cycle of the vehicle.

Unlike at least some known RFID systems that require a user to manually adjust a power level, the RFID reader described herein automatically adjusts the power level to accurately and efficiently detect a plurality of RFID tags. Further, as compared to manually checking vehicle equipment, the RFID reader described herein integrates configuration and location data to confirm a location of one or more objects that each include an RFID tag.

The implementations described herein may utilize executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radio-frequency identification (RFID) reader comprising:
   a transmitter/receiver module configured to transmit a radio signal at a plurality of different power levels to a plurality of RFID tags;
   a non-transitory memory configured to store a first power level previously determined to be an optimal power level for interrogating a first tagged object;
   a control module coupled to the transmitter/receiver module and the non-transitory memory, the control module configured to:
      retrieve the first power level for interrogating the first tagged object from the non-transitory memory;
      transmit a radio signal using the first power level;
      detect a number of RFID tags associated with the first tagged object;
      control a transmission power level of the plurality of different power levels at which the radio signal is transmitted based on the number of RFID tags detected when transmitting the radio signal at the first power level;
      update the stored first power level based on the controlled transmission power level and the number of RFID tags detected; and
      determine a position of at least one of the RFID tags detected based on the updated first stored power level and location information of the RFID reader.

2. An RFID reader in accordance with claim 1, wherein, when more than one RFID tag is detected at the first power level, the control module is further configured to:
   determine whether the first power level is a minimum power level;
   decrease the power level if the first power level is not the minimum power level; and
   indicate a failure if the first power level is the minimum power level.

3. An RFID reader in accordance with claim 1, wherein, when only one RFID tag is detected at the first power level, the control module is configured to:
   collect information from the detected RFID tag; and
   store the first power level in a database stored in the non-transitory memory.

4. An RFID reader in accordance with claim 3, wherein, when only one RFID tag is detected at the first power level, the control module is further configured to:
   calculate the optimal power level from the first power level; and
   store the optimal power level in the database as the first power level.

5. An RFID reader in accordance with claim 1, wherein, when no RFID tags are detected at the first power level, the control module is configured to:
   determine whether the first power level is a maximum power level;
   increase the power level if the first power level is not the maximum power level; and
   indicate a failure if the first power level is the maximum power level.

6. An RFID reader in accordance with claim 1, wherein the control module is further configured to:
   receive configuration information;
   determine location information; and
   integrate the configuration and location information to confirm a location of at least one object that includes an RFID tag.

7. An RFID reader in accordance with claim 1, wherein the configuration information is a layout of passenger accommodations for an aircraft.

8. A method for operating a radio-frequency identification (RFID) reader, the method comprising:
   storing, in a non-transitory memory, a first power level previously determined to be an optimal power level for interrogating a first tagged object;
   retrieving the first power level for interrogating the first tagged object from the non-transitory memory;
   transmitting a radio signal from the RFID reader at the first power level;
   determining, using a processing device, a number of RFID tags associated with the first tagged object detected when transmitting the radio signal at the first power level;
   controlling, using the processing device, a transmission power level of the RFID reader based on the number of RFID tags detected;
   updating the stored first power level based on the controlled transmission power level and the number of RFID tags detected; and
   determine a position of at least one of the RFID tags detected based on the updated first stored power level and location information of the RFID reader.

9. A method in accordance with claim 8, wherein, when more than one RFID tag is detected at the first power level, the method further comprises:
   determining whether the first power level is a minimum power level;
   decreasing the power level if the first power level is not the minimum power level; and
   indicating a failure if the first power level is the minimum power level.

10. A method in accordance with claim 8, wherein, when only one RFID tag is detected at the first power level, the method further comprises:
   collecting information from the detected RFID tag; and
   storing the first power level in a database stored in the non-transitory memory.

11. A method in accordance with claim 10, wherein, when only one RFID tag is detected at the first power level, the method further comprises:
   calculating the optimal power level from the first power level; and
   storing the optimal power level in the database as the first power level.

12. A method in accordance with claim 8, wherein, wherein, when no RFID tags are detected at the first power level, the method further comprises:
   determining whether the first power level is a maximum power level;
   increasing the power level if the first power level is not the maximum power level; and
   indicating a failure if the first power level is the maximum power level.

13. A method in accordance with claim 8, further comprising:
   receiving, at the processing device, configuration information;
   determining location information; and
   integrating, at the processing device, the configuration and location information to confirm a location of at least one object that includes an RFID tag.

14. A method in accordance with claim 13, wherein receiving configuration information comprises receiving a layout of passenger accommodations for an aircraft.

15. A method for confirming a location of at least one object, the method comprising:
    receiving, at a processing device, configuration information;
    determining location information for a radio-frequency identification (RFID) reader;
    storing, in a non-transitory memory, a first power level previously determined to be an optimal power level for interrogating at least one RFID tag associated with the at least one object;
    scanning, using the RFID reader and the first power level retrieved from the non-transitory memory, the at least one RFID tag associated with the at least one object;
    receiving responses from a number of RFID tags, wherein at least one of the responses is from the at least one RFID tag associated with the at least one object;
    controlling a transmission power level of the RFID reader based on the number of RFID tags detected when transmitting a radio signal at the first power level;
    updating the stored first power level based on the controlled transmission power level and the number of RFID tags detected;
    determining a position of the at least one RFID tag detected based on the updated stored power level and the location information of the RFID reader; and
    integrating, using the processing device, the configuration information, the location information of the RFID reader, and the determined position to confirm the location of the at least one object.

16. A method in accordance with claim 15, wherein receiving configuration comprises receiving a layout of passenger accommodations for an aircraft.

17. A method in accordance with claim 15, wherein determining a position of the at least one RFID tag detected further comprises determining a location of the at least one RFID tag relative to the RFID reader.

18. A method in accordance with claim 15, wherein determining location information comprises determining location information for the RFID reader relative to a plurality of other objects, and wherein integrating the configuration and location information comprises integrating the configuration and location information to confirm a location of the at least one object relative to the plurality of other objects.

19. A method in accordance with claim 15, wherein controlling a transmission power level of the RFID reader further comprises:
    controlling, using the processing device, the transmission power level of the RFID reader based on the number of RFID tags detected, wherein the transmission power level is controlled until exactly one of the at least one RFID tag is scanned; and
    updating the stored first power level based on the controlled transmission power level.

20. A method in accordance with claim 15, wherein the at least one object includes a plurality of life vests, and wherein integrating the configuration and location information comprises integrating the configuration and location information to determine whether each seat on a vehicle includes a corresponding one of the plurality of life vests.

21. A RFID reader in accordance with claim 1, wherein the control module is further configured to retrieve a default power level when no power level is associated with the first tagged object in the non-transitory memory.

22. A RFID reader in accordance with claim 6, wherein the control module is further configured to retrieve the first power level based on the configuration and location information.

23. A method in accordance with claim 15, wherein the first power level is determined according to the location information for the RFID reader.

24. A method in accordance with claim 15 further comprising retrieving the first power level from the non-transitory memory, wherein the first power level is selected from the group consisting of:
    a default power level for the RFID reader; and
    a power level associated with the at least one RFID tag associated with the at least one object.

* * * * *